United States Patent Office 3,444,156
Patented May 13, 1969

3,444,156
PROCESS FOR HARDENING GELATINE
René de Montmollin, Riehen, Hansrolf Loeffel, Bern, Alfred Oetiker, Fribourg, and Arthur Buehler, Rheinfelden, Switzerland, assignors to Ciba Limited, Basel, Switzerland, a company of Switzerland
No Drawing. Filed June 28, 1966, Ser. No. 561,057
Claims priority, application Switzerland, July 5, 1965, 9,370/65
Int. Cl. C09h 9/00; G03c 1/30
U.S. Cl. 260—117                     9 Claims

ABSTRACT OF THE DISCLOSURE

Gelatine is hardened with a monomeric compound which is practically colorless. This compound contains at least one acidic group imparting solubility in water and at least two $\alpha,\beta$-ethylenically unsaturated $\alpha$-halogen-carboxylic amide radicals. This process is especially suitable for hardening gelatine in photographic emulsions.

---

The present invention provides a process for hardening gelatine, wherein the gelatine is reacted with a compound which is, at most, only slightly coloured and which contains at least one acidic group imparting solubility in water and at least two $\alpha,\beta$-ethylenically unsaturated $\alpha$-halogen-carboxylic acid amide residues.

The compounds of the kind defined may contain, for example, carboxylic acid groups or preferably sulphonic acid groups as acidic groups imparting solubility in water. The compounds containing these groups may be in the form of free acids or in the form of salts, especially ammonium or alkali metal salts. One or more such groups, for example, up to four such groups may be present in the molecule.

These compounds also each contain at least two acylamino groups which are derived from $\alpha,\beta$-unsaturated carboxylic acids. An iodine or chlorine atom, but preferably a bromine atom is bound to the carbon atom in the $\alpha$-position. Other substituents may also be present and the acyl residue advantageously contains not more than four carbon atoms. The residues of $\alpha$-chloracrylic acid and especially $\alpha$-bromacrylic acid are preferred.

The acylamino groups may be bound to aliphatic carbon atoms or to ring carbon atoms, it being possible for the latter to be members of a heterocyclic or isocyclic ring, but preferably of an aromatic ring. As examples of aromatic rings there may be mentioned naphthalene rings and especially benzene rings. When the molecule of the acylamino compound contains more than one ring, the rings may be joined together either directly or through bridging groups, for example, —SO$_2$—, —SO$_2$—HN—, —CO—HN—, —HN—CO—NH, —CH$_2$—CH$_2$, —NH—alkylene—HN—, —CH=CH—, —S—, —CO—, —OC—A—CO—, in which A represents a benzene, furan, thiophene, pyridine, —(—CH$_2$)$_4$— or —CH=CH— residue. The cyclic residues, especially the aromatic residues, may also contain additional substituents, for example, halogen atoms, for example, chlorine; alkyl groups, for example, ethyl and methyl groups; alkoxy groups, for example, ethoxy and methoxy groups; or hydroxyl groups. It is also possible for further substituents, especially alkyl groups, to be attached to the nitrogen atoms of the acylamino groups or for the nitrogen atoms to be members of a heterocyclic ring, for example, a piperazine ring.

Compounds deserving special mention which are, at most, only slightly coloured are those of the formula (I)          $\left[ R \right] \begin{matrix} (-X)_m \\ (-Y)_n \end{matrix}$ in which R represents an aromatic residue, X represents an $\alpha$-chloracrylic or $\alpha$-bromacrylic acid amide residue bound to the said aromatic residue through its nitrogen atom, Y represents a sulphonic acid or carboxylic acid group and $m$ and $n$ represent whole numbers, $m$ being at least 2. Compounds that are specially valuable are those of the formula (II) 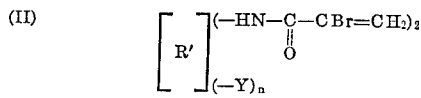

in which R' represents an aromatic residue having 1 to 2 benzene rings and $n$ is an integer of 1 to 4 preferably 1 or 2.

Acylamino compounds of the composition indicated above are obtainable when compounds which are, at most, only slightly coloured and which contain at least two acylatable amino groups and at least one acidic group imparting solubility in water are acylated with reactive derivatives of $\alpha,\beta$-ethylenically unsaturated $\alpha$-halogen-carboxylic acids.

However, preference is given to reaction with $\alpha,\beta$-dihalogen-alkane-carboxylic acid derivatives because they are much more readily obtainable than the corresponding unsaturated monohalogenated compounds and because the additional reaction, that is to say, elimination of hydrogen halide, proceeds extremely readily, in some cases as soon as the diamines or polyamines are acylated. The halides, especially the chlorides, of carboxylic acids are advantageously used as acylating carboxylic acid derivatives.

It is indicated in the foregoing that the amines to be acylated are, in particular, aromatic amines having at least two amino groups, principally those having two primary amino groups and 1 to 4 sulphonic acid groups. As examples of amines that are suitable for the manufacture of acylamino compounds of the kind defined by the above process there may be mentioned: 3,5-diaminobenzoic acid, 1,3-diaminobenzene-4-sulphonic acid, 1,3-diaminobenzene-4,6- or 5,6-disulphonic acid, 1,4-diaminobenzene-2-sulphonic acid, 1,4-diaminobenzene-2,5-disulphonic acid, 1,3-diamino-4-methylbenzene-6-sulphonic acid, 1,3-diamino-4,6-dimethylbenzene-5-sulphonic acid, 1,3-diamino-4-methoxybenzene-5-sulphonic acid, 4,4'-diaminodiphenyl-2,2'-disulphonic acid, 4,4'-diaminodiphenyl-3,3'-disulphonic acid, 4,4'-diaminodiphenyl-3-sulphonic acid, 4,4'-diamino-3,3'-dichlorodiphenyl-6,6'-disulphonic acid, 4,4'-diamino-3,3'-dimethyldiphenyl-6,6'-disulphonic acid, 4,4'-diaminodiphenyl-3,3'-dicarboxylic acid, 4,4'-diaminodiphenylene-3,3'-bis-glycollic acid, 4,4'-diaminodiphenylamine-6-sulphonic acid, 4,4'-diaminostilbene-2,2'-disulphonic acid, 1-amino-4-(4'-aminophenylsulphonylamino)benzene-2-sulphonic acid, 4,4'-diaminodiphenylsulphone-2-sulphonic acid, 1,5-diaminonaphthalene-7-sulphonic acid, 1,8-diaminonaphthalene-5-sulphonic acid, 2,6-diaminonaphthalene-4,8-disulphonic acid, 1,5-diaminonaphthalene-4,8-disulphonic acid, 1,5-diaminonaphthalene-2,6-disulphonic acid, 1,5-diaminonaphthalene-3,7-disulphonic acid and 1,8-diaminonaphthalene-3,7-disulphonic acid.

The acylamino compounds can be prepared in known manner. Acylation is advantageously carried out in an aqueous, neutral to slightly alkaline medium in the presence of an agent capable of binding acid, for example, at a pH value between 7 and 8 and at a temperature within the range of from 0 to 40° C., preferably at a temperature within the range of from 0 and 20° C. These conditions ensure not only complete acylation, but also a more or less quantitative elimination of hydrogen halide when the acylating agent used is an $\alpha,\beta$-dihalogen-alkane-carboxylic acid. To ensure quantitative elimination of hydrogen halide, the pH value can be raised, for example, to about 12 when acylation is complete, that is to say, when free amino groups are no longer detectable. Some of the acylamino compounds so obtained can be precipitated by the addition of salt, if necessary, after the solutions have been neutralized. However, this is generally not necessary in respect of the use of the acylamino compounds in accordance with the invention. It is generally possible to make direct use of the aqueous solutions obtained from the reaction.

Reaction of the gelatine with the acylamino compounds is carried out in the usual manner and generally proceeds easily. For example, an aqueous solution of the hardening agent can be combined with the gelatine at a slightly elevated temperature, for example, at a temperature within the range of from about 30 to 60° C., and the gelatine, which may contain silver halide and/or other substances used in the preparation of photographic materials, is cast on a support in the usual manner to form a coating and dried if necessary. The coating can then be left to stand for a certain time at an elevated temperature, for example, for 24 hours, or at room temperature. During this period the coating becomes increasingly harder and the melting point of the gelatine is raised considerably, for example, by from 10 to 50° C. The degree of hardness achieved by reaction of the acylamino compound with the gelatine may be higher or lower, depending on the temperature, the reaction period, and the constitution and amount of hardening agent. The amount of hardening agent used, based on the amount of dry gelatine, is advantageously within the range of from 0.5 to 5%.

The acylamino compounds to be used as hardening agents must contain at least two groups capable of reacting with gelatine; the hardening process is obviously based on a high degree of cross linkage. The groups imparting solubility in water do not interfere with the hardening process in any way. Not only do they allow the hardening agent to be added to the colloid dissolved in water in the form of an aqueous solution, but they also ensure maintenance of the ability of the gelatine to swell, which is generally highly desirable. Neither the photographic properties of the light-sensitive coatings nor the reactivity of the dyestuff couplers or dyestuffs are impaired by the hardening process of the invention. Furthermore, the hardening agents cause virtually no change in the pH value or viscosity of the gelatine.

A specially valuable feature is that the cross-linking properties of these water-soluble hardening agents are maintained in aqueous solution; in spite of the presence of reactive groups the said properties are maintained for a sufficiently long period of time. The hardening agents only show their properties in the desired manner when water-soluble colloids are present.

The parts and percentages in the following manufacturing instructions and examples are by weight unless otherwise stated. The term "sulphonic acid" and the formulation "—SO₃H" are used, irrespective of whether the compound concerned is in the form of a free acid, a salt or in a dissociated state.

Manufacturing instructions A 268 parts of 1,4-diaminobenzene-2,5-disulphonic acid are added to 2,000 parts of water and 295 parts of 30% potassium hydroxide solution, the pH value being adjusted to 7; virtual dissolution takes place. After clarifying by filtration, the filtrate is cooled to 10° C. and a mixture comprising 660 parts of dibromopropionyl chloride and 480 parts of acetone is added dropwise at the same temperature in the course of several hours while stirring vigorously. The pH value is kept at 7 by simultaneous dropwise addition of 1,460 parts of potassium bicarbonate solution (30% by volume). The batch is stirred for a further hour, during which process the temperature rises to 20° C. A number of crystals are precipitated towards the end of the reaction.

The batch is cooled to 5° C. and the pH is adjusted to 12 with 50 parts of a 30% potassium hydroxide solution, the temperature being kept below 10° C. by the addition of ice. The acrylic derivative is precipitated in the form of a white substance. After 8 minutes, the pH is adjusted to 7 with acetic acid, the batch is suction filtered and the filter residue is washed with a small amount of ice water.

For the purpose of hydrolysing the excess acid chloride, the pale yellow precipitate is suspended in 1,000 parts of water and stirred overnight in a neutral medium in the presence of potassium acetate solution. The suspension is cooled to 5° C. and the precipitate is washed with a small amount of ice water and acetone. To ensure complete removal of propionic acid derivatives, the precipitate is suspended in 800 parts of acetone, isolated by suction filtration, washed several times with acetone and dried in vacuo at 40° C.

The almost colourless precipitate is recrystallized from 2,600 parts of water. 366 parts of 1,4-di(α-bromacryloylamino)benzene-2,5-disulphonic acid dipotassium salt of the formula (1)

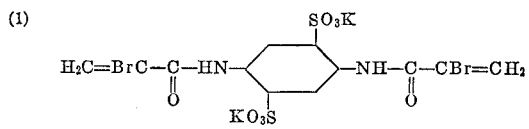

are obtained in the form of a white powder. It can be used as it is for hardening gelatine. Empirical formula: $C_{12}H_8Br_2N_2S_2O_8K_2$.

*Analysis.*—Calculated: C, 23.61; H, 1.32; N, 4.58; Br, 26.20. Found: C, 23.80; H, 1.39; N, 4.47; Br, 26.35.

Manufacturing instructions B 51 parts of α,β-dibromopropionic acid chloride, which may be mixed with 40 parts of acetone, are slowly added at 10° C., while stirring, to a neutral solution of 11.5 parts of 1,3-diamino-2,4,6-trimethylbenzene-5-sulphonic acid in 200 parts of water, the pH being kept at 7 to 8 by the dropwise addition of a 2 N sodium hydroxide solution. After acylation, 2 N sodium hydroxide solution is added in an amount such that the pH value is adjusted to 12.0, the batch is stirred for about 8 minutes at 5° C. and then neutralized to pH 7.0 with hydrochloric acid. The solution of the compound so obtained whose free acid corresponds to the formula (2)

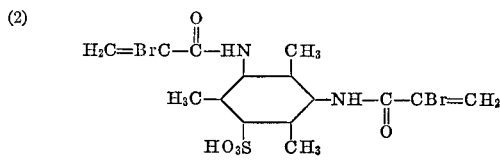

can be used per se for hardening gelatine. The yield of di-α-bromacrylamino compound is virtually quantitative.

If acylation is carried out with α-bromacrylic acid chloride, subsequent raising of the pH value to 12 may be omitted. However, even when acylation is carried out in the manner indicated with α,β-dibromopropionic acid chloride and the pH value is not raised, a solution is obtained that can be used immediately for hardening gelatine.

It is also possible to acylate 1,4-diaminobenzene-2-sulphonic acid or 1,3-diaminobenzene-4-sulphonic acid by the above process instead of 1,3-diamino-2,4,6-trimethylbenzene-5-sulphonic acid, the solutions of compounds whose free acids correspond to the following formulae being obtained after raising of the pH value to 12 and subsequent neutralization:

(3)

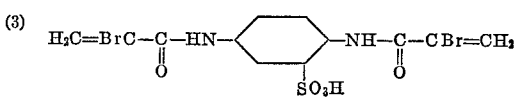

or (4) 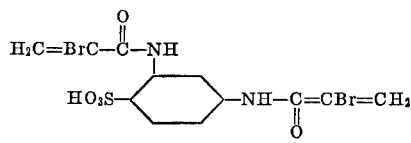

Manufacturing instructions C 30 parts of α,β-dibromopropionic acid chloride, which may be mixed with 25 parts of acetone, are slowly added, dropwise, at 10° C., while stirring, to a neutral solution of 18.6 parts of 3,3′-dimethyl-4,4′-diaminodiphenyl-6,6′-disulphonic acid in 200 parts of water, the acid liberated during the acylation process being continuously neutralized with a 2 N sodium hydroxide solution. After acylation, 15 parts by volume of a 10 N sodium hydroxide solution are added, the batch is stirred for about 8 minutes at 5° C. and neutralized to pH 7 with about 5 parts by volume of a 10 N hydrochloric acid solution. The yield of diacylamino compound, whose free acid corresponds to the formula (5) 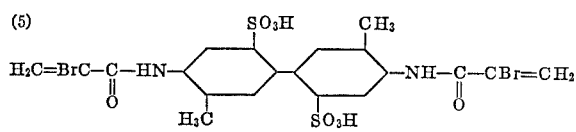

is practically quantitative. If desired, the 3,3′-dimethyl-4,4′ - bis(dibromopropionylamino)diphenyl - 6,6′-disulphonic acid, which is in solution, may be salted out prior to elimination of the hydrogen bromide; it is then isolated by filtration and dried.

sodium - 2,6 - di(bromacryloylamino)naphthalene - 4,6-disulphonate of the formula (6) 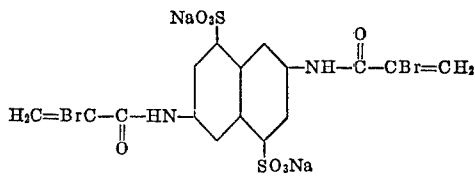

is obtained. The compounds of the Formulae 7 to 11 can also be prepared according to manufacturing instructions A to D:

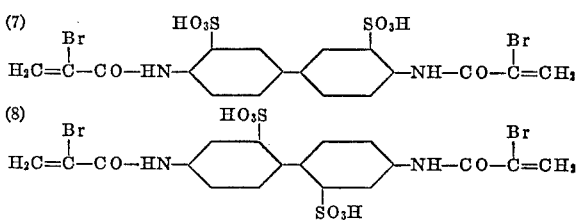

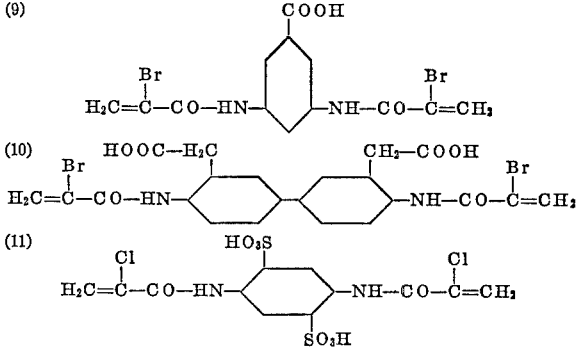

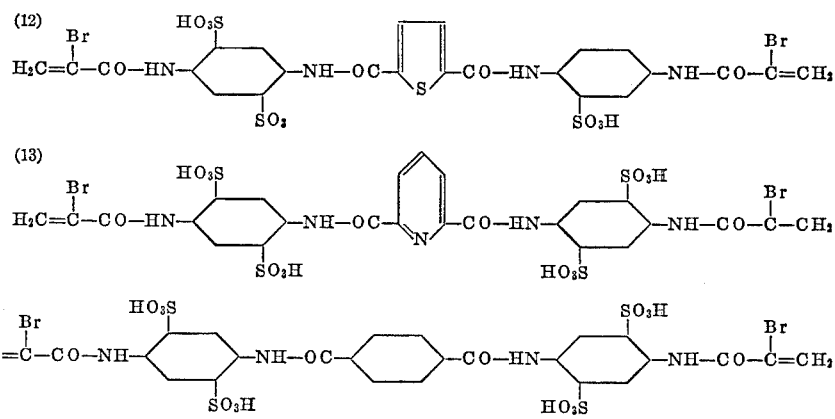

By using 19.5 parts of α,β-dichloropropionic acid chloride instead of 30 parts of α,β-dibromopropionic acid chloride, the corresponding chloracrylic compound is obtained instead of the bromacrylic compound.

Manufacturing instructions D 75 parts of α,β-dibromopropionyl chloride, which may be mixed with 60 parts of acetone, are slowly added, while stirring, to a neutral solution of 31.8 parts of 2,6-diaminonaphthalene-4,6-disulphonic acid in 700 parts of water at 10° C., the pH value being kept at 7 to 8 by the dropwise addition of a 10 N sodium hydroxide solution. After acylation, 10 N sodium hydroxide solution is added in an amount such that the pH value is adjusted to 12.0. The batch is then stirred for about 8 minutes at 5° C. and then neutralized to pH 7.0 with 10 N hydrochloric acid. The product that precipitates is isolated by filtration and washed with cold water. The product is recrystallized several times from distilled water and analytical-grade

Manufacturing instructions E (for the compounds corresponding to Formulae 12 to 14)

111 parts of 1,4-diaminobenzene-2,5-disulphonic acid are dissolved in 1,250 parts of water and 181 parts of 30% potassium hydroxide solution. After clarifying by filtration at pH 7 and cooling to 10° C., a mixture comprising 104 parts of dibromopropionyl chloride and 80 parts of acetone is added dropwise in the course of 4 hours while stirring vigorously. The pH value is kept at 7 with 236 parts of potassium bicarbonate solution (30% by volume). The batch is stirred overnight, and a slightly turbid solution is formed.

3 parts of borax are added to 210 parts of the solution so prepared. 5 parts of terephthalic acid dichloride are dissolved in 300 parts of acetone and added. Stirring is continued for 24 hours, whereupon the grey precipitate is isolated by suction filtration and dissolved in 750 parts of water. The pH value is adjusted to 12 for 8 minutes with potassium hydroxide solution at 5° C., and then readjusted to 7 with 10% acetic acid, which process causes white crystals to precipitate. 253 parts of 7 N potassium acetate solution are added. The precipitate is isolated by filtration and dried. 13.7 parts of crystals of the compound whose free acid corresponds to the formula

(14)
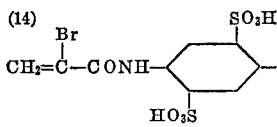—NHOC—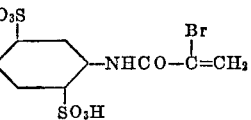—CONH—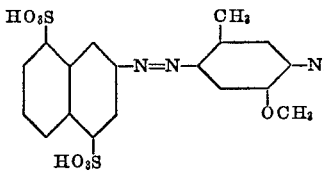—NHCO—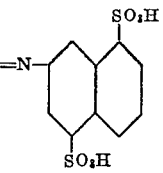

are obtained. Compounds 12 and 13 can be prepared by a similar process.

EXAMPLE 1

1 millilitre of a 1% hardener solution of the Formula 1 and 3 ml. of water are added to 6 ml. of a 6% gelatine solution. The solution is cast on a substrated plate measuring 13 cm. x 18 cm. at a temperature of 40° C. and is then dried at room temperature in a drying cabinet for 6 hours. The plate is stored for 24 hours at room temperature and is then treated for 2 hours at 50° C. in a climatic test cabinet at a relative humidity of 65%. The plate is cut into strips. When a strip is heated to 90° C. in water the coating of gelatine shows no change and remains attached to the glass.

EXAMPLE 2

0.4 part of the diazo dyestuff of the formula

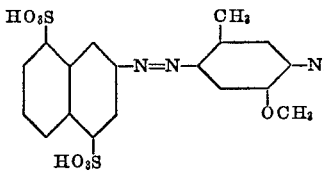

dissolved in 37.5 parts of water, is added at 40° C. to 100 parts of an emulsion containing 8 parts of gelatine and 2 parts of silver; one of the usual wetting agents and 0.315 part of the hardener of the Formula 1 dissolved in 12.6 parts of water are also added.

The batch is cast on a triacetate support, dried, and then stored for 48 hours. A yellow silver halide coating is obtained which can be developed to a yellow component image by the silver dyestuff bleaching process. The coating has a melting point above 80° C. and can well withstand the severe conditions of the treatment baths.

EXAMPLE 3

2.5 parts of a dyestuff coupler of the formula

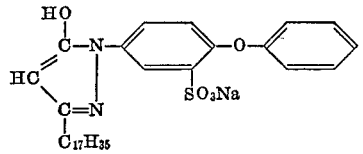

dissolved in 50 parts of water, which is suitable for chromogenic development are added at 40° C. to 100 parts of an emulsion containing 10 parts of gelatine and 3 parts of silver; one of the usual wetting agents and 0.3 part of the hardener of the Formula 1 dissolved in 12 parts of water are also added. The batch is cast, dried, and stored for 24 hours. A hardened coating is obtained which may form a component of multicolour material. The coating can withstand the numerous baths in which colour reversal material has to be treated without any inhibitory effect on the activity of the colour coupler.

EXAMPLE 4

A 2.5% aqueous solution of the α-bromacrylic compound of Formula 1 is prepared. Increasing amounts of the solution, namely 4, 6 and 8 ml. are added to 100 ml. each of silver halide emulsion having a gelatine content of 10%; the emulsion is at a temperature of 40° C. The amounts correspond to a hardener content of 1,2 and 3 grams per 100 grams of gelatine respectively. One of the usual wetting agents is added to the mixtures, the pH value is adjusted to 7 and the mixtures are cast on to a photographic support at 40° C. to form coatings having a thickness of 16μ.

Subsequently, the test samples are treated under the following conditions:

(1) Normal storage for 24 hours, 1 and 2 weeks at 23 to 28° C. and a relative humidity of 40 to 80% (Table I), and at 21 to 22° C. and a relative humidity of 45 to 60% (Table II).

(2) Dry heat treatment for 24 hours at 50° C. and a relative humidity of 12 to 15% (Table I).

(3) Moist heat treatment for 6 to 15 hours at 43° C. and a relative humidity of 69% (Table II).

Gelatine can also be hardened in the same manner with the compounds of the Formulae 2 to 14. If the test samples were treated for 24 hours at 50° C. and at a relative humidity of 65%, it is possible to use smaller amounts of hardener, namely 0.5 and 1 gram of hardener per 100 grams of gelatine (Table I).

Tables I and II indicate the rise in the melting point of the gelatine coatings that can be achieved.

TABLE I

| Formula No. | State | Gm./100 gm. gelatine | Normal storage (° C.) | | | Dry heat 24 hrs. (° C.) | Moist heat (° C.) | | 24 hrs. (° C.) |
| --- | --- | --- | --- | --- | --- | --- | --- | --- | --- |
| | | | 24 hrs. | 1 wk. | 2 wks. | | 6 hrs. | 15 hrs. | |
| (1) | Solid | 0.5 | 90 | 90 | 90 | 90 | | | 90 |
| (2) | Liquid | 0.5 | 35 | 54 | 90 | 79 | | | 90 |
| | | 1.0 | 36 | 90 | 90 | 90 | | | 90 |
| (3) | Solid | 0.5 | 37 | 90 | 90 | 90 | | | 90 |
| | | 1.0 | 40 | 90 | 90 | 90 | | | 90 |
| (4) | do | 1.0 | 35 | 35 | 43 | 36 | | | 82 |
| (5) | do | 0.5 | 37 | 90 | 90 | 90 | | | 90 |
| | | 1.0 | 39 | 90 | 90 | 90 | | | 90 |
| (6) | do | 0.5 | 37 | 90 | 90 | 90 | | | 90 |
| | | 1.0 | 90 | 90 | 90 | 90 | | | 90 |
| (9) | do | 2 | 34 | 45 | | | 90 | 90 | |

Hardener 1–6—Normal storage: 23–28° C. at 40–80% relative humidity.
Hardener No. (9)—Normal storage: 21–22° C. at 45–60% relative humidity.

TABLE II

| Formula No. | State | Gm./100 gm. gelatine | Normal storage 1 week (° C.) | Climatic test cabinet 6 hours | 15 hours |
|---|---|---|---|---|---|
| 1 | Solid | 2 | 62 | 90 | 90 |
| 7 | Solid | 2 | 36 | 56 | 76 |
|   | Liquid | 3 | 36 | 59 | 82 |
| 8 | Solid | 2 | 35 | 47 | 80 |
| 10 | Liquid | 3 | 35 | 47 | 90 |
| 11 | Solid | 3 | 35 | 38 | 90 |
| 12 | do | 3 | 35 | 36 | 90 |
| 13 | do | 3 | 36 | 37 | 90 |
| 14 | do | 3 | 35 | 39 | 90 |

Normal storage: 21–22° C. at 45–60% relative humidity.
Climatic test cabinet: 43° C. and 69% relative humidity.

What is claimed is:

1. A process for hardening gelatine, which comprises reacting the gelatine with a monomeric compound which is practically colorless and which contains at least one carboxylic or sulfonic acid group imparting solubility in water attached to an aromatic ring carbon atom and at least two $\alpha,\beta$-ethylenically unsaturated $\alpha$-halogen-carboxylic amide radicals attached to an aromatic ring through its nitrogen atom.

2. A process for hardening gelatine as claimed in claim 1, which comprises reacting gelatine with a monomeric compound which is practically colorless and which contains at least one carboxylic or sulfonic acid group imparting solubility attached to an aromatic ring carbon atom and at least two $\alpha$-halogen-acrylic acid amide radicals attached to an aromatic ring through its nitrogen atom.

3. A process for hardening gelatine as claimed in claim 1, which comprises reacting gelatine with a monomeric compound which is practically colorless and which contains at least one sulfonic acid group attached to an aromatic ring carbon atom and at least two $\alpha$-halogen-acrylic acid amide radicals attached to an aromatic ring through its nitrogen atom.

4. A process for hardening gelatine as claimed in claim 1, which comprises reacting gelatine with a monomeric compound which is practically colorless and which contains at least one sulfonic acid group attached to an aromatic ring carbon atom and at least two $\alpha$-halogen-acrylic acid amide radicals attached to an aromatic ring through its nitrogen atom.

5. A process for hardening gelatine as claimed in claim 1, which comprises reacting gelatine with a monomeric compound which is practically colorless and which corresponds to the formula

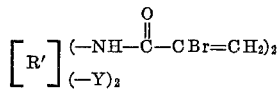

in which R represents an aromatic radical, X represents an $\alpha$-bromacrylic acid amide radical bound to the said aromatic radical through its nitrogen atom, Y represents a member selected from the group consisting of a sulfonic acid or carboxylic acid group attached to an aromatic ring carbon atom and $m$ and $n$ represents whole numbers, $m$ being at least 2 and and $n$ being at least 1.

6. A process for hardening gelatine as claimed in claim 1, which comprises reacting gelatine with a monomeric compound which is practically colorless and which corresponds to the formula

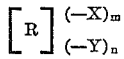

in which R' represents as aromatic radical having up to 2 benzene rings, Y represents a member selected from the group consisting of a sulfonic acid group and a carboxylic acid group attached to an aromatic ring carbon and $n$ represents an integer from 1 to 4.

7. A process for hardening gelatine as clamed in claim 1, which comprises reacting gelatine with a monomeric compound which is practically colorless of the formula

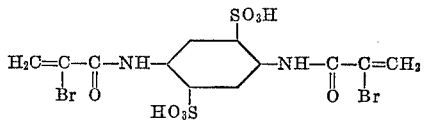

or its ammonia or alkali metal salts.

8. A process for hardening gelatine as claimed in claim 1, which comprises reacting gelatine with a monomeric compound which is practically colorless of the formula

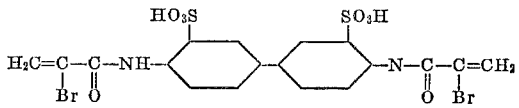

or its ammonia or alkali metal salts.

9. A process for hardening gelatine as claimed in claim 1, which comprises reacting gelatine with a monomeric compound which is practically colorless of the formula

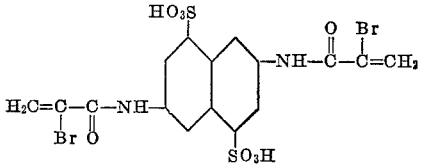

or its ammonia or alkali metal salts.

References Cited

UNITED STATES PATENTS

| 2,476,527 | 7/1949 | Barnes et al. | 260—8 |
| 2,852,382 | 9/1958 | Illingsworth et al. | 96—97 |
| 3,255,000 | 6/1966 | Gates et al. | 96—111 |
| 3,257,208 | 6/1966 | Van Paesschen et al. | 96—114 |

WILLIAM H. SHORT, *Primary Examiner.*

H. SCHAIN, *Assistant Examiner.*

U.S. Cl. X.R.

96—111